US005746563A

United States Patent [19]

Steckler

[11] Patent Number: 5,746,563
[45] Date of Patent: May 5, 1998

[54] CAR AND A DEVICE FOR INSERTING AND TAKING OUT A WHEEL CHAIR FROM A LUGGAGE COMPARTMENT

[76] Inventor: Dov Steckler, 28 Segula Street, Industrial Zone Segula, Petach Tioua, Israel, 49 277

[21] Appl. No.: 496,899

[22] Filed: Jun. 29, 1995

Related U.S. Application Data

[63] Continuation of Ser. No. 973,148, Nov. 6, 1992, abandoned.

[30] Foreign Application Priority Data

Apr. 2, 1992 [IL] Israel ................................ 101460

[51] Int. Cl.⁶ .................................................. B60P 3/06
[52] U.S. Cl. ........................................... 414/462; 414/921
[58] Field of Search ................... 414/462, 464–467, 414/542, 543, 546–550, 744.6, 921; 212/180, 230–231, 258, 264, 348

[56] References Cited

U.S. PATENT DOCUMENTS

| 274,527 | 3/1883 | Stelle et al. ............... 212/230 X |
| 3,531,006 | 9/1970 | Farchmin .................. 414/462 |
| 3,807,592 | 4/1974 | Lynn et al. ................ 414/462 |
| 4,127,200 | 11/1978 | Mann ....................... 414/543 |
| 4,249,853 | 2/1981 | Lyvers ..................... 212/230 X |
| 4,406,574 | 9/1983 | Riley ....................... 414/462 X |
| 4,440,540 | 4/1984 | Gottlieb et al. ........... 414/921 X |
| 4,544,321 | 10/1985 | Lanier ...................... 414/542 |
| 4,565,482 | 1/1986 | Baker ....................... 414/921 X |
| 4,573,854 | 3/1986 | McFarland ................. 414/921 X |
| 4,671,729 | 6/1987 | McFarland ................. 414/921 X |
| 4,671,730 | 6/1987 | Gateau ..................... 414/495 |
| 4,753,567 | 6/1988 | Achee, Sr. ................ 414/921 X |
| 5,029,717 | 7/1991 | Chambers et al. .......... 414/921 X |
| 5,090,580 | 2/1992 | Nelson ..................... 414/921 X |
| 5,096,361 | 3/1992 | Crawford .................. 414/462 |
| 5,205,700 | 4/1993 | Lin et al. ................ 414/921 X |
| 5,308,214 | 5/1994 | Crain et al. ............. 414/921 X |
| 5,431,526 | 7/1995 | Peterson et al. .......... 414/462 X |

*Primary Examiner*—James W. Keenan
*Attorney, Agent, or Firm*—Edwin D. Schindler

[57] ABSTRACT

In a standard motor car which includes a luggage compartment, there is affixed to one point in that compartment a collapsible wheel chair. The compartment also contains a mechanical, motor operated feature which lifts the wheel chair from the compartment and transports it to a point beside the car, easily approachable by an invalid driver who can now shift himself from the driver's seat to the wheel chair.

4 Claims, 16 Drawing Sheets

CAR AND A DEVICE FOR INSERTING AND TAKING OUT A WHEEL CHAIR FROM A LUGGAGE COMPARTMENT

This is a continuation of application Ser. No. 08/973,148, filed Nov. 6, 1992, now abandoned.

FIELD AND BACKGROUND OF INVENTION

The present invention deals with a problem which is one of those which invalids and persons incapacitated in various ways have to face. Such persons might be able to drive a passenger motor car which is adapted to a greater or lesser extent to their needs, but when out of the car they have to use a wheel chair, generally a foldable one.

While an invalid who retains the command of her or his arm and hands might be able to handle the foldable wheel chair and stow it away in the space behind that person's, i.e. the driver's seat, this solution is far from satisfactory in every aspect. First, the manipulation of the wheel chair causes a considerable physical effort on the invalid, and further it usually means full occupation of the space behind the driver, such that there would be no room for possible passengers accompanying the invalid. Finally the wheels of the wheel chair which possibly had to go over wet or muddy terrain in order to reach the respective motor car would dirty the upholstery of the back seats and are even likely to tear it.

DRAWBACKS OF KNOWN ARRANGEMENTS

Even more complicated and serious is the problem which faces paraplegics. It has been possible to adapt a standard motor car to the needs of such a person but the solutions offered in such cases are also not satisfactory. To stow a wheel chair in the luggage compartment of an ordinary passenger car and to retrieve it from there, when needed is utterly impossible to a paraplegic, she or he would require the assistance of a second person who would not be available always.

It is known to provide means for the use of paraplegics who travel in their own motor car and also carry a foldable wheel chair with them. For such persons an arrangement has been devised and is in use, which comprises a relatively large, box like container which is fixedly mounted on the roof of the car, while mechanical, battery actuated arrangements enable the incapacitated driver to retrieve the wheel chair from its container on the roof, place it on the ground beside the driver's seat in the latter's reach, so that she or he can shift her- or himself from the driver's seat onto the wheel chair. This arrangement, while serving the paraplegic is insatisfactory also, though in a different way, from the solution for persons who can still use—even in a partial way—their arms. The structure on the roof of the car affects the aerodynamic properties of the vehicle and distracts from its safe performance. It also displaces the centre of gravity of the vehicle, thus creating a further safety problem when the car is driven.

Finally the whole arrangement which enables a partly or fully incapacitated person to take along a wheel chair might have to be transferred from one car to another which is a costly operation in the course of which certain mechanical or electrical elements would have to be fully discarded and replaced by other such parts which would be mounted, in the second car along with part of the equipment from the original car.

OBJECTS OF INVENTION

It is the object of the present invention to do away with most or all of the disadvantages and difficulties inherent to the known arrangements for making it possible to an incapacitated driver of a motor car to take along that person's wheel chair in the car.

It is, a further object of the invention to provide a solution which would not occupy any space in the passenger part of an ordinary automobile be it a standard "private" car or a so called estate vehicle.

It is also an object of the invention to provide an arrangement for the purpose in view which would permit relatively convenient and inexpensive dismounting of the arrangement from one car and transfer it to another vehicle.

PRACTICAL RESULTS AND EFFECT OF PROPOSED SOLUTION

The new arrangement according to the invention would permit carrying the needed wheel chair in the luggage compartment of a car, placing also all mechanical parts needed for handling the wheel chair within the luggage compartment, such that the exterior appearance and its all over shape and properties would not be changed. Further the whole interior of the passenger compartment would remain free for use of persons who would accompany the driving invalid.

The elimination of the above mentioned drawback and disadvantages of existing arrangement and the realization of the above stated objects appears to lie in the basic idea to store the foldable wheel chair, when not in actual use on the ground, together with equipment enabling the invalid driver of a motor car to handle the wheel chair stored in the luggage compartment of his or her car and transfer the wheel chair onto a convenient position on the ground, beside the driver's seat, such that he or she would be able to shift her/himself from the motor car onto the wheel chair.

SHORT SUMMARY OF INVENTION

Thus at its broadest aspect the invention provides standard motor cars having a roomy luggage compartment in which compartment is provided and is at one point fixedly attached mechanical and electrical equipment which includes a gripper or carrying means for holding a wheel chair, the said equipment including a system of lever or rods actuated for pre-conceived and predesigned movement carrying a wheel chair held by the said gripper or carrying means.

SHORT STATEMENT OF PREFERRED EMBODIMENT

As an example of realization the basic principle of the invention two practical embodiments will be given.

In a first practical embodiment the new arrangement comprises an electromotor with linearly acting gear which motor is fixedly attached to the interior of the luggage compartment of a standard passenger car or other motorized vehicle which has such, or a similar compartment, a pair of hingedly connected levers the first of which is affixed to the bottom of the luggage compartment, while the second lever consists of at least two telescoping parts and carries at its free ends means for gripping the folded wheel chair reposing on the bottom of the compartment, electromotors being provided for actuating the said levers and microswitches controlled from the driver's seat and the necessary connections to the car battery or other source of current and switches within the reach of the driver actuating the said electromotors.

In a case of the vehicle being a passenger car which includes a lid covered luggage compartment the linearly acting gear is connected to the lid of the luggage compartment.

3

The practical embodiment of that example of the new arrangement will become clear from the following detailed description which also indicates the function of its different parts, referring to the annexed drawings.

In the drawings

FIGS. 13–16 relate to a second embodiment of the invention, i.e.

In view of the number of electric switches and miniswitches and for easier reference to these in connection with the drawings, there follows here a list of makes and breaks of switches and of miniswitches.

| Reference Numeral | Purpose of Motor |
| --- | --- |
| Motors | |
| 20 | Motor with linearly acting gear for opening and shutting lid or door of luggage compartment |
| 21 | Motor for horizontal movement |
| 22 | Motor with linearly acting gear |
| 23 | Motor and gear for actuating extension of telescoping lever |
| Microswitches | |
| 30 | Final movement (inwardly) of lid of luggage compartment |
| 31 | Intermediate position of wheel chair |
| 32 | Outward movement, prior to |

4

-continued

| Reference Numeral | Purpose of Motor |
| --- | --- |
| | telescope extension |
| 33 | Horizontal movement of chair |
| 34 | Final movement of chair |
| 35 | Extension of telescope |
| 36 | Opening lid of compartment |
| 37 | Shutting lid of compartment |

Figure 1:
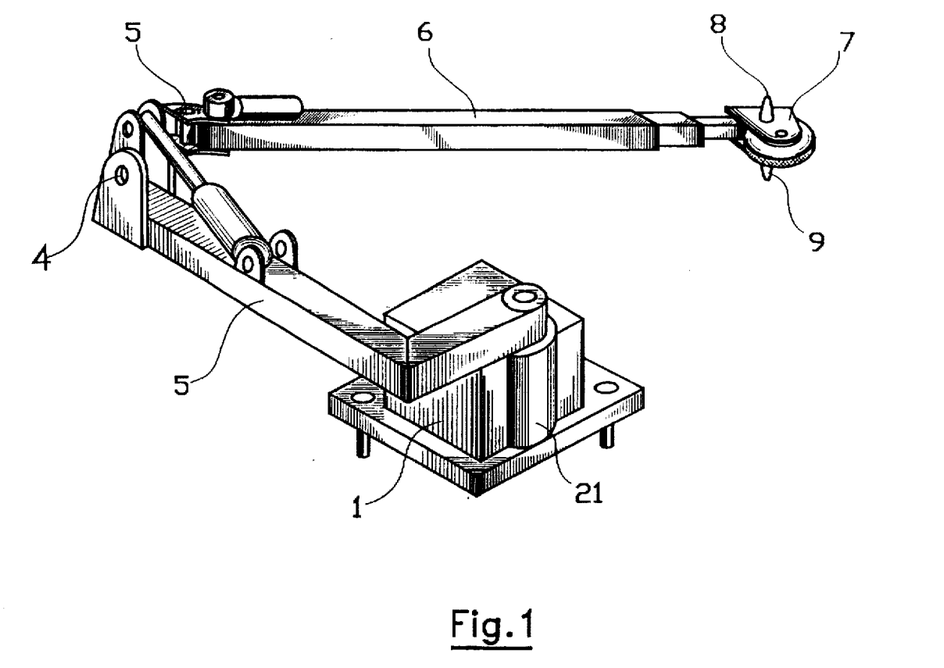
FIG. 1 is a schematic view of the pair of actuating levers with the means affixing them to the bottom of the luggage compartment.
Figure 8:
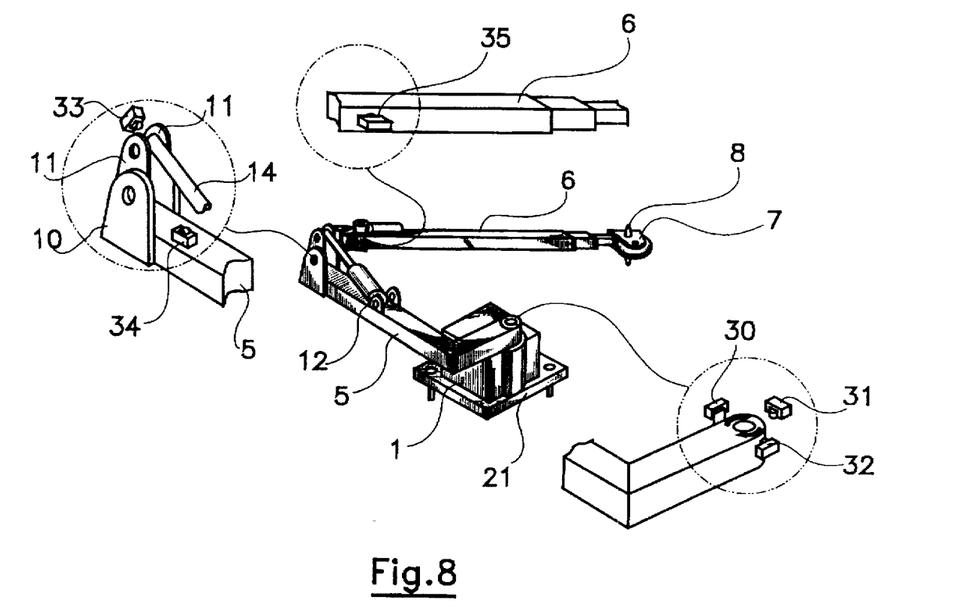
FIG. 8 repeats the view of FIG. 1 and shows working details of the actuating mechanism at enlarged scale.
Figure 9:
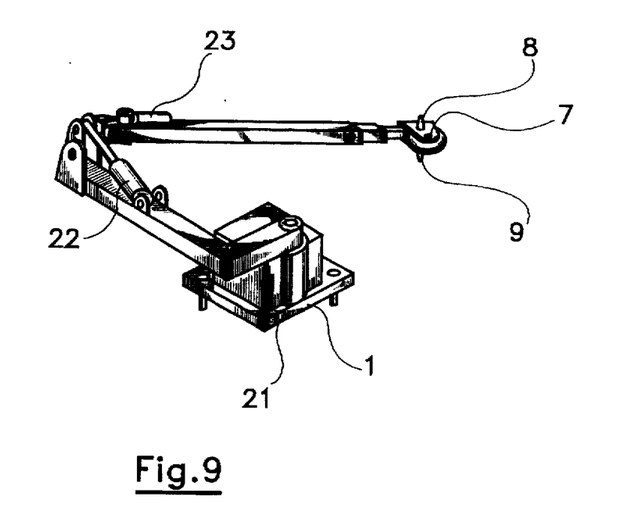
FIG. 9 is a like view emphasizing the actuating electromotors.
Figure 10:
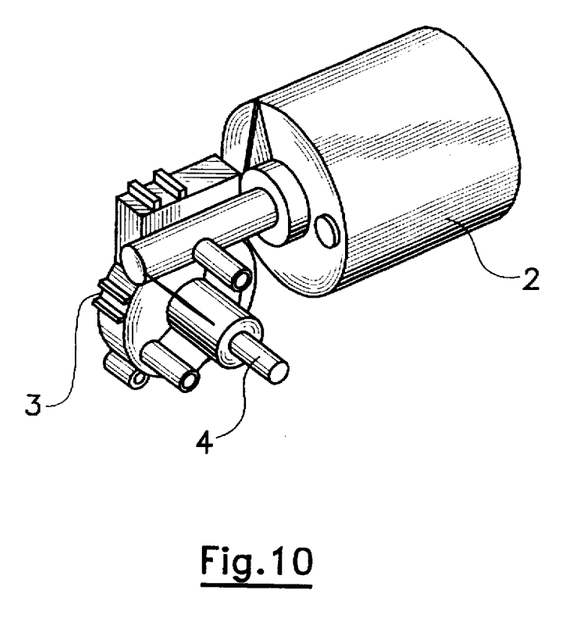
FIG. 10 shows a typical drive assembly used.

Turning first to FIG. 1, there is shown the main operative part of the new assembly of mechanisms. A small platform 1 is affixed to the bottom of the luggage compartment of a passenger motor car or at any appropriate part in a so called "station" or "estate" car (see also FIGS. 8 and 9). On platform 1 is positioned an electromotor 21 with an appropriate reduction gear 3 (see FIG. 10) from which extends a take off shaft 4. Such drive units are generally known and do not require detailed description. Apart from the fact that shaft 4 extends vertically relative to platform 1 and imparts movement in a horizontal plane to a lever 5 which consists of two portions defining a right angle between them and which is connected to a second lever 6 via a joint to which reference will be made. This latter lever 6 comprises two or three parts which telescope into one another and are movable relative to each other. As can be seen in FIGS. 1 and 8, the free end of lever 6 carries a plate 7 from which extend to opposite directions fingers 8 and 9. There are associated with the operative levers 5 and 6 some mechanical details which are indicated in FIG. 8. At the far end of lever 5, near its hinged connection with lever 6 there extends from lever 6 a pair of connecting plates 10, fixedly relative to lever 5 and holding turnably a pair of ears 11. On lever 5 is positioned a pair of ears 12 holding between them a small electromotor 22 with linearly acting gear 14, this latter motor being turnably connected to ears 11.

Figure 2:
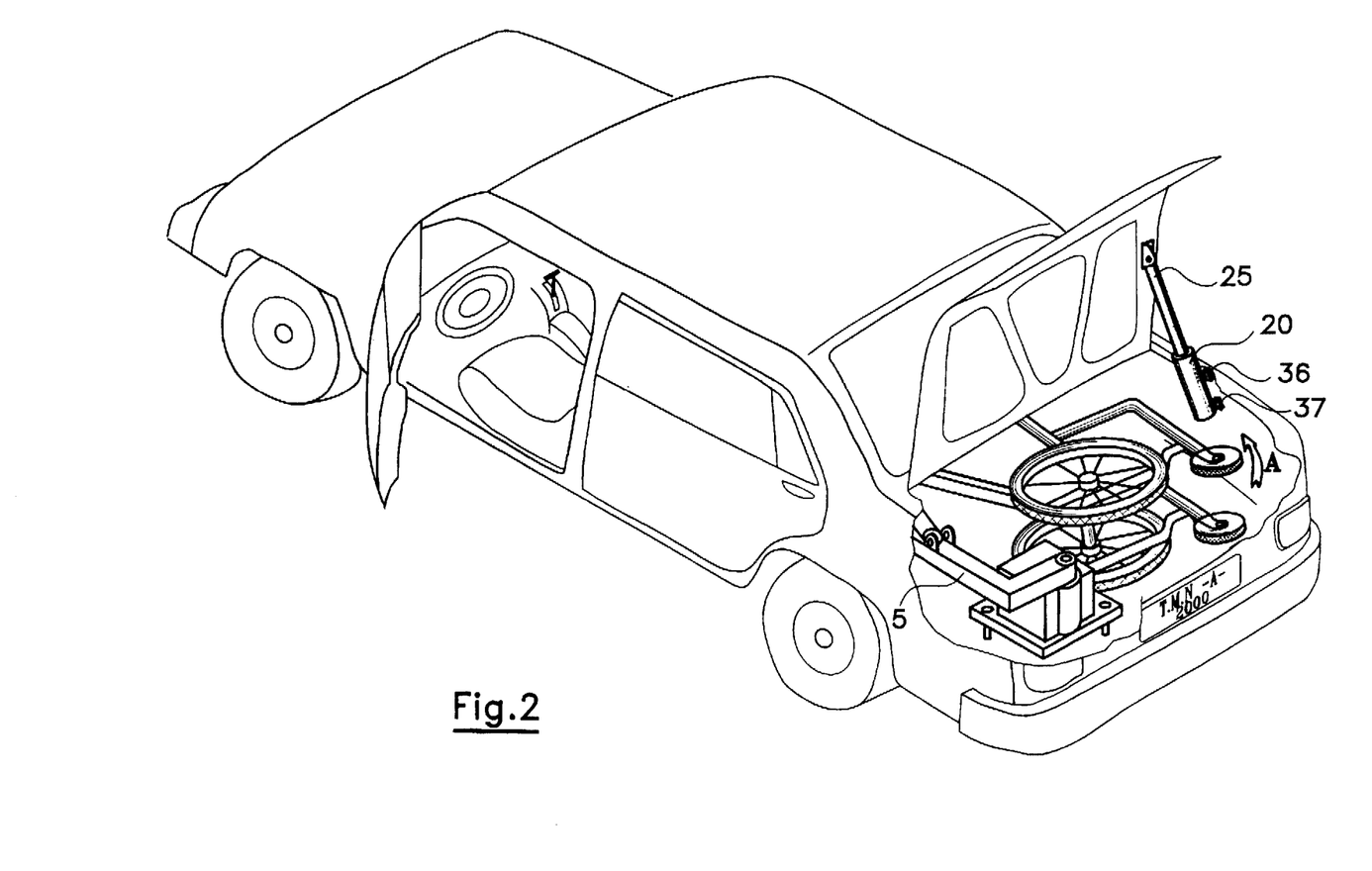
FIG. 2 is a phantom representation of an automobile showing the opened luggage compartment with the means for opening and shutting the door or lid thereof, a folded wheel chair being positioned in the compartment.
Figure 3:
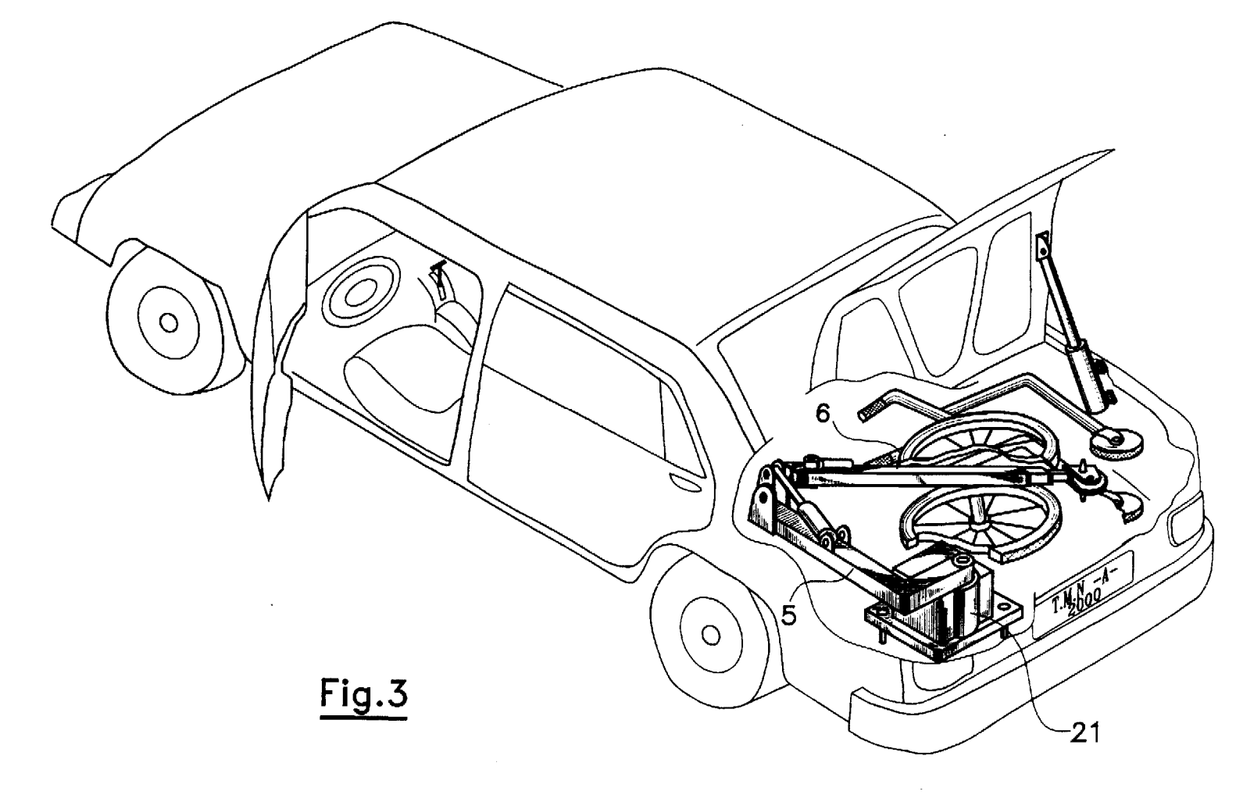
FIG. 3 is a like view illustrating the commencement of activity of the pair of levers which manipulate the folded wheel chair.
Figure 4:
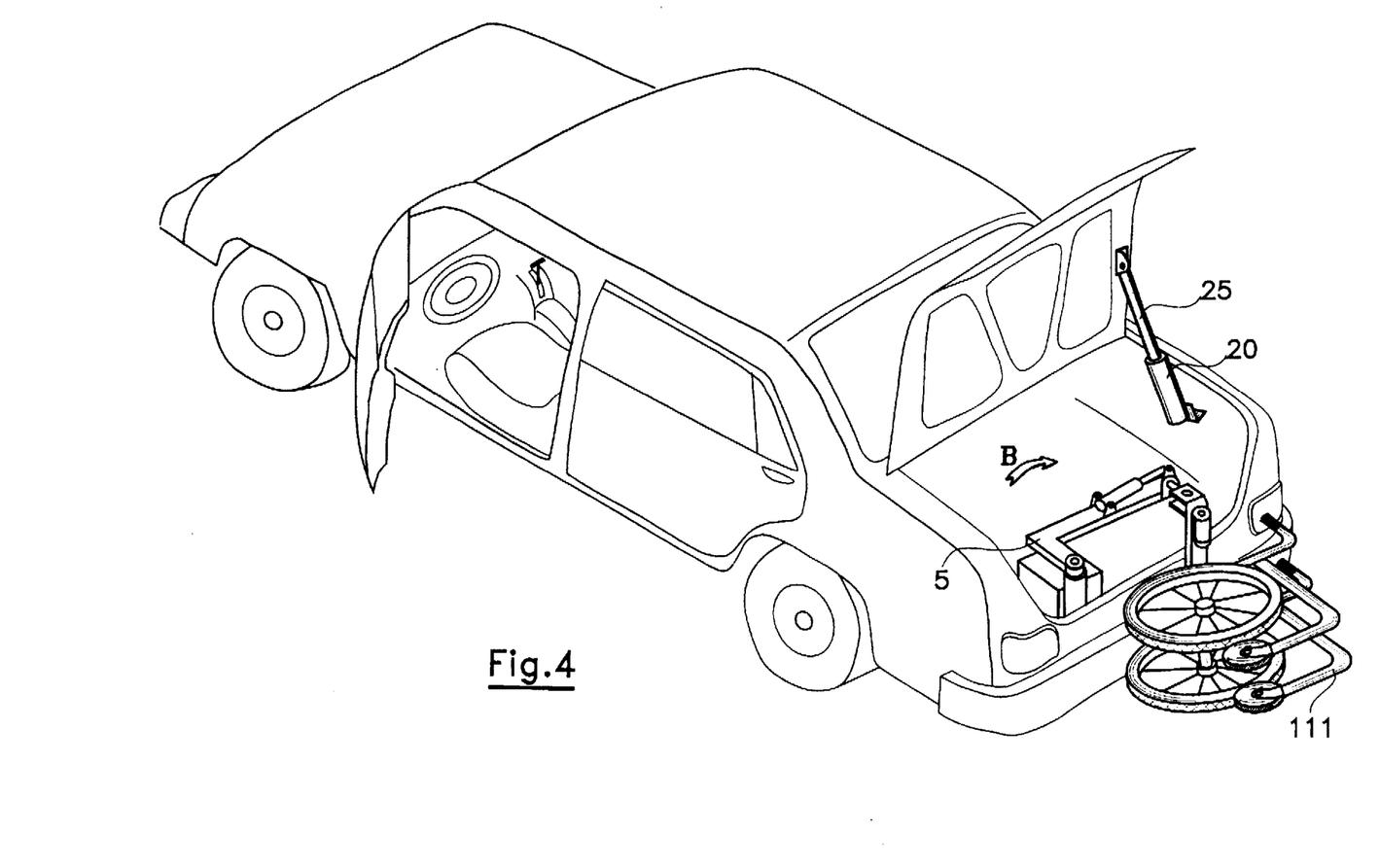
FIG. 4 is a similar view illustrating the pair of levers which have swung the wheel chair through an horizontal, archuate path.
Figure 5:
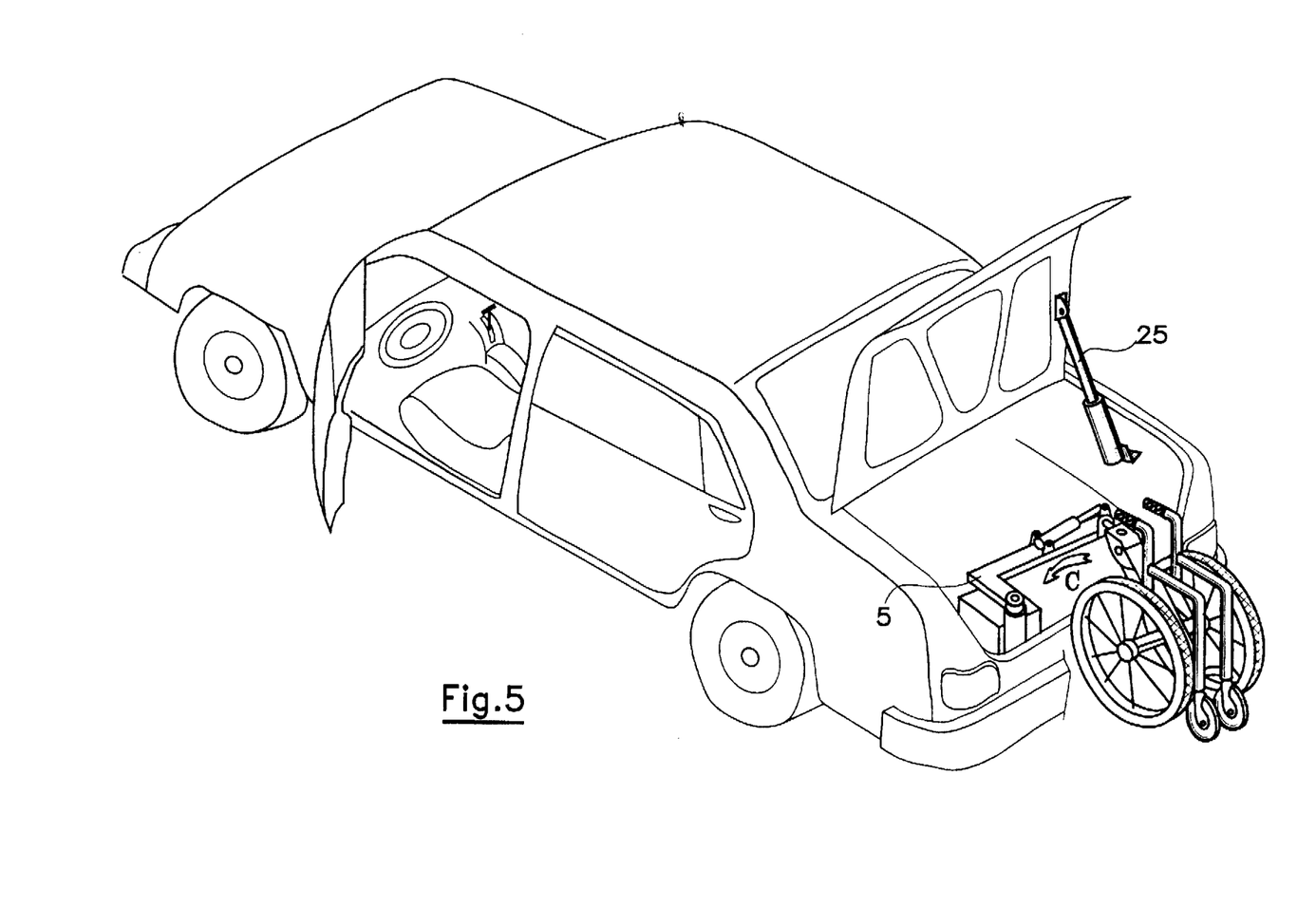
FIG. 5 shows the collapsed (folded) wheel chair having been turned through. substantially 90°.
Figure 6:
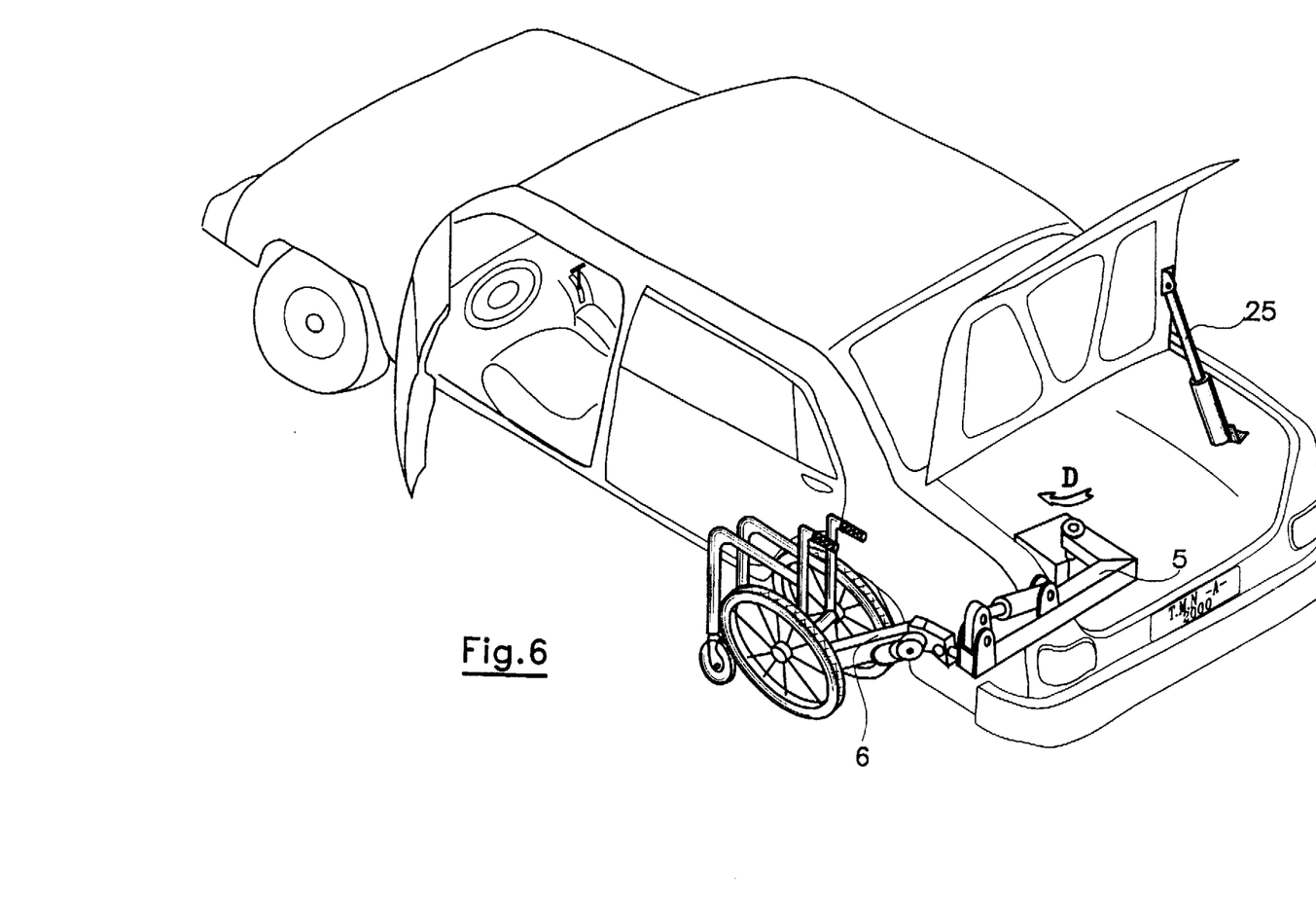
FIG. 6 is a further view showing the wheel chair turned through an angle of 90° on the ground.
Figure 7:
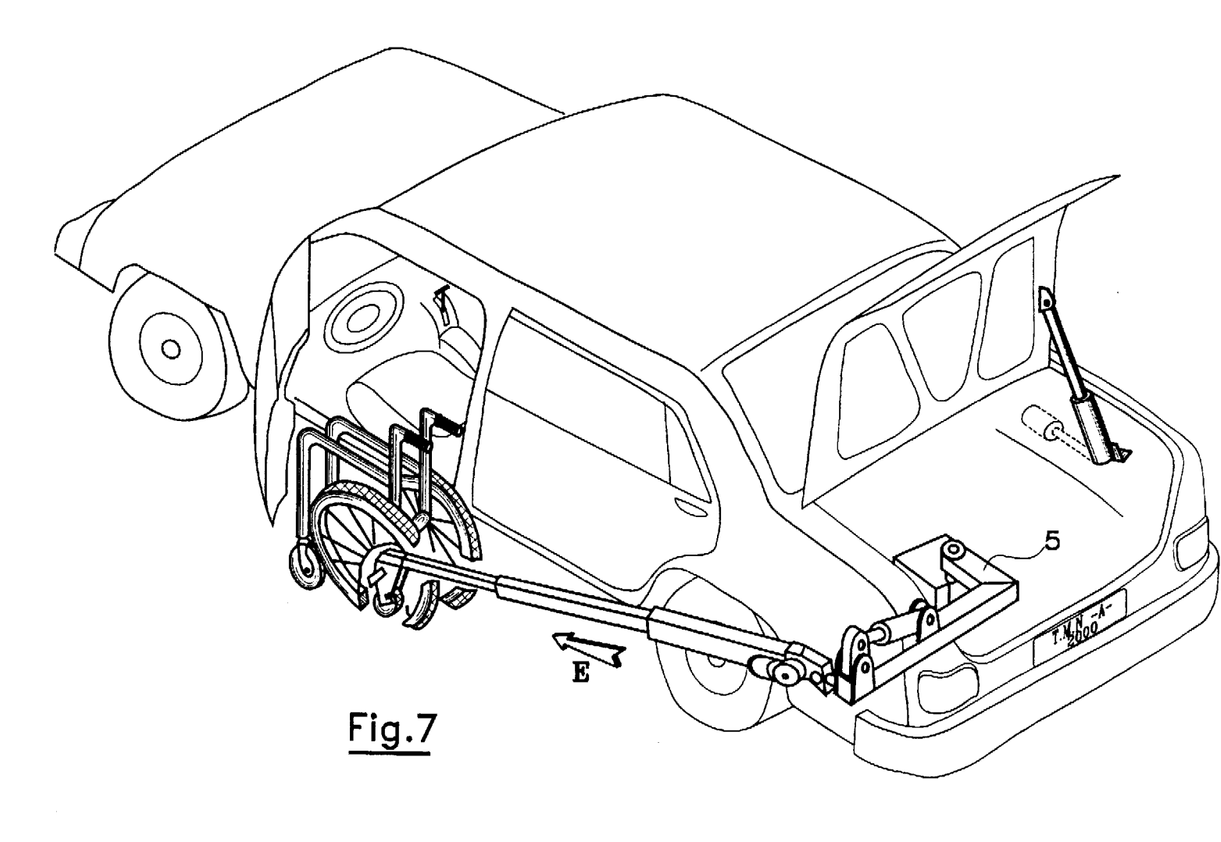
FIG. 7 illustrates the action of the second lever in extended position of its telescoping parts depositing the wheel chair beside the driver's position.
Figure 11:
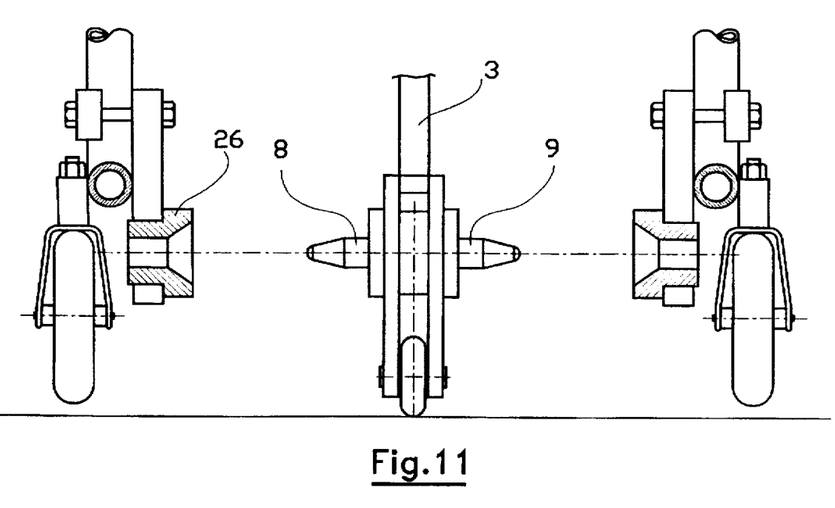
FIGS. 11 and 12 illustrate the connecting of the telescoping lever with the wheel chair.
Figure 12:
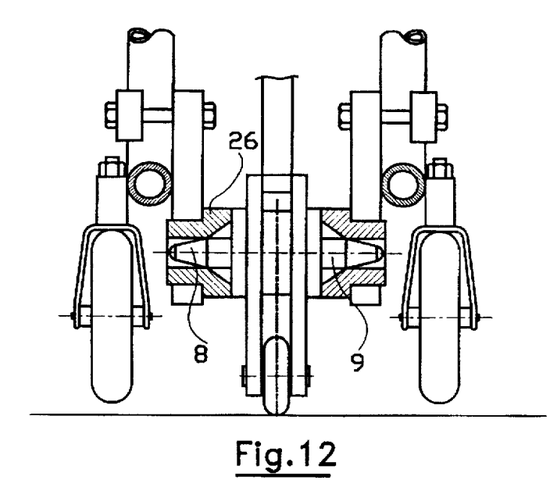
Figures 12A, 12B, 12C, 12D, 12E, 12F:
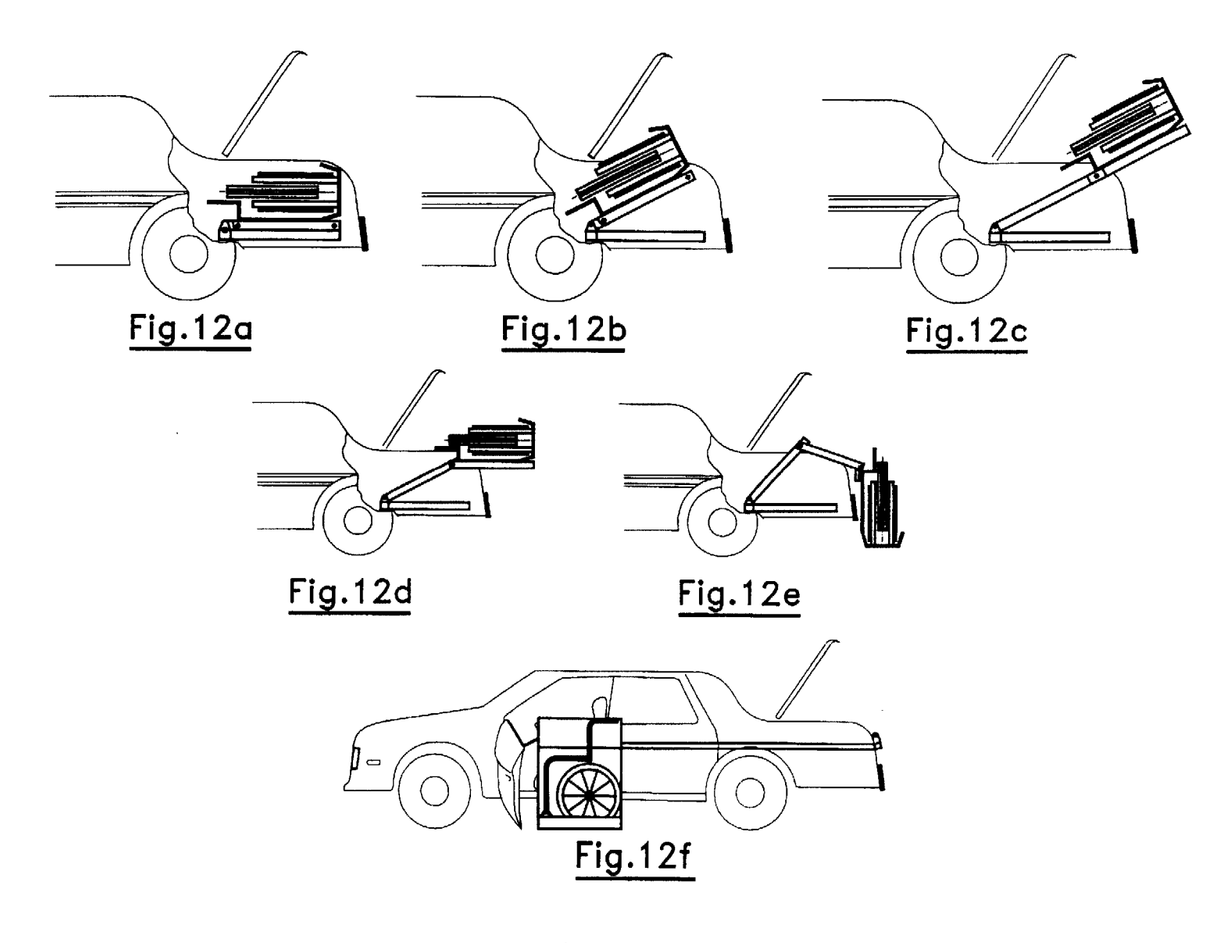
FIGS. 12a–12f illustrate the successive positions of the wheel chair during transfer from the luggage compartment.

The operation of the arrangement becomes clear from FIG. 2 and the following ones: The luggage compartment is opened by actuation of a microswitch which, in turn, controls motor 20 which causes rod 25 to lift the lid, as illustrated in FIGS. 1 and 2. The collapsed wheel chair lying on the bottom of the compartment can now be mowed. It is attached to lever 6 whose fingers 8 and 9 are matingly engaged by shells 26 which are fixedly connected with the chassis of the wheel chair (see FIGS. 11 and 12). By actuation of lever 6 the chair is now moved in the direction of arrow A in FIG. 2 to the position of FIG. 3 and is turned in a horizontal movement (arrow B, FIG. 4) out of the luggage compartment. From that position it is turned by lever 5 in the direction of arrow C (FIG. 5) to the position of FIG. 6 (arrow D) still being held on lever 6, from which position it is shifted by the extending part of lever 6 in the direction of arrow E to a station beside the driver's seat. The driver, as is known, manipulates the wheel chair and unfolds it.

These steps Are repeated in reverse order to refold the chair and return it to the luggage compartment.

Figure 13:
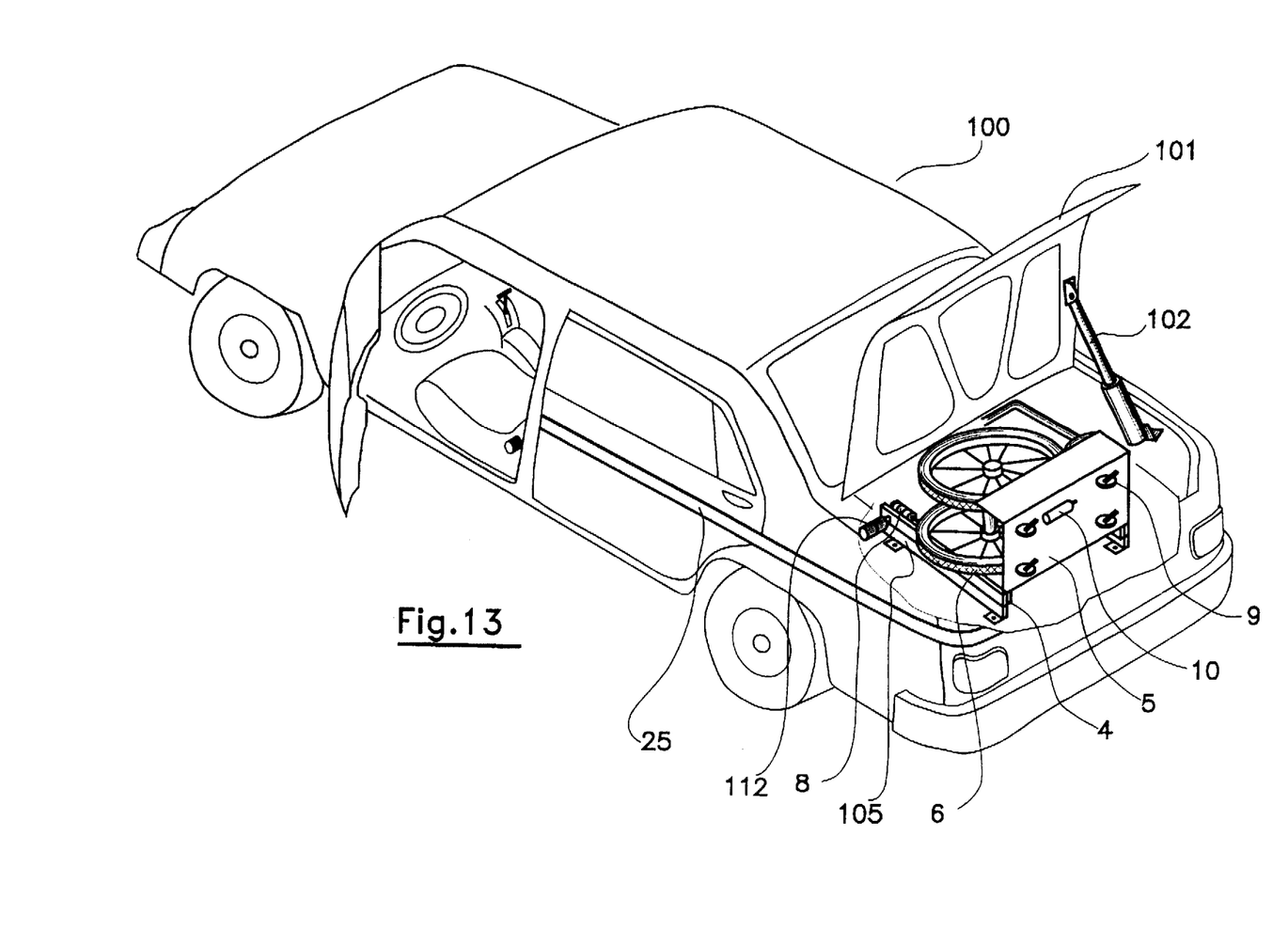
FIG. 13 is a view similar to FIG. 1 but incorporating somewhat different mechanical equipment.
Figure 13A:
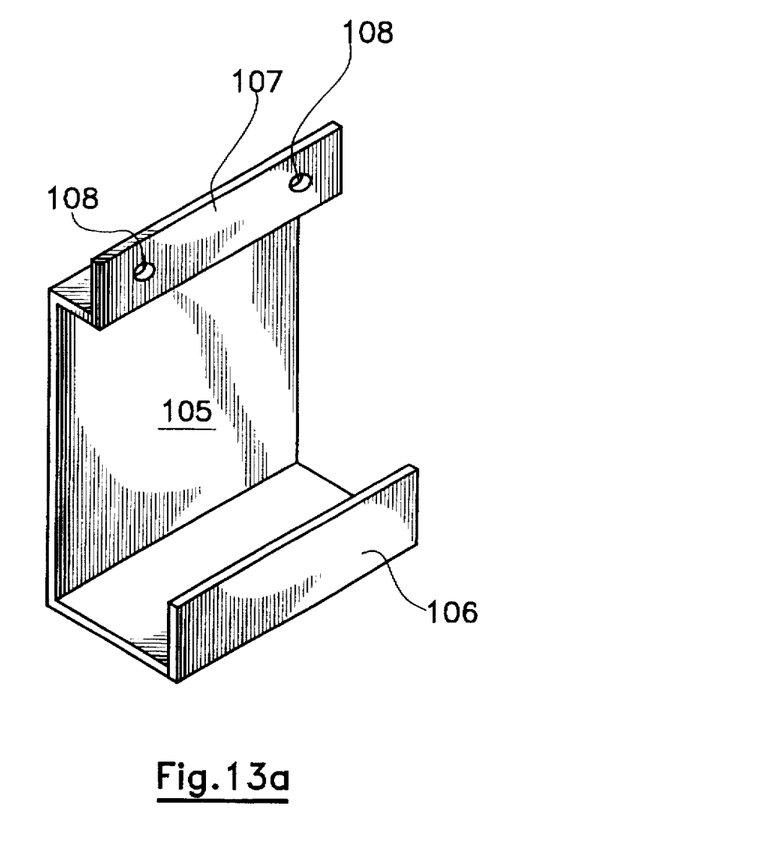
FIG. 13a shows a detail of the equipment of FIG. 13.

Turning now to FIG. 13 illustrating a second embodiment of the invention, in a standard passenger ear 100 the lid 101 of the luggage compartment which is opened and shut by a motor and linear gear 102 as already described in detail and shown in FIG. 2 so that no further elucidation appears to he required. On the bottom of the luggage compartment reposes a structure being a system of interlinked levers 104 (FIG. 14) which support a carrier 105 including a shelf 106 (see, also, FIG. 13a). An upstanding rim 107 of the rear wall of carrier 105 has two small castors 108. The two levers 104 of the lever system are hingedly affixed via ear 109 to the bodywork of the luggage compartment. As can be gathered from FIG. 14 the lever system 104 is expandable spatially and horizontally to extend out of the confines of the compartment. In the luggage compartment is affixed to a wall thereof a motor 110 with rotational gear whose rotating shaft is connected to the carrier 105. On the shelf 106 of the carrier 105 and supported by the rear wall thereof reposes a wheel chair 111.

There are provided appropriate switches and wiring between the car battery (or other source of power) to the motors. The control of motor activity is by means of contents at the dashboard of the car, accessible to the driver.

Figure 14:
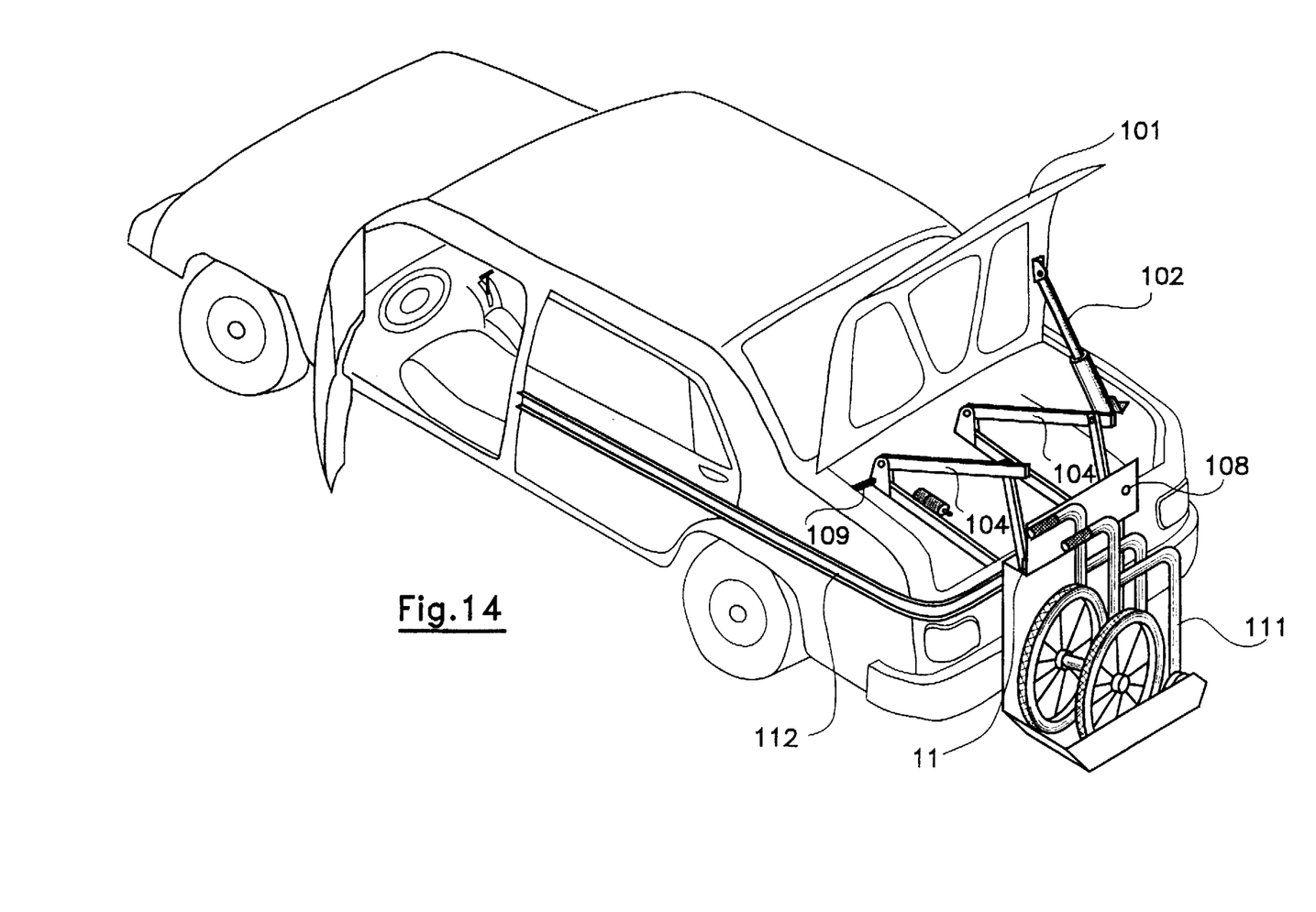
FIG. 14 shows the second embodiment with wheel chair lifted from luggage compartment and standing on the ground.

On a command issuing from the dashboard the lever system 104, under drive from motor 110 lifts and turns the carriage 105 with the wheel chair 111 and deposits it on the ground as shown in FIG. 14. On the bottom of shelf 106 (not seen in FIG. 13a) are provided castors. On the outside of the car's body extends from the rear and along its side wall a rail 112. In the position of FIG. 14 the castors on the outside of the shelf 106 touch the ground and those 108 on the upstanding rim 107 rest on rail 112. At the underside of shelf 106 is provided a small motor with a castor on its shelf which forms the drive for the carrier 105.

Figure 15:
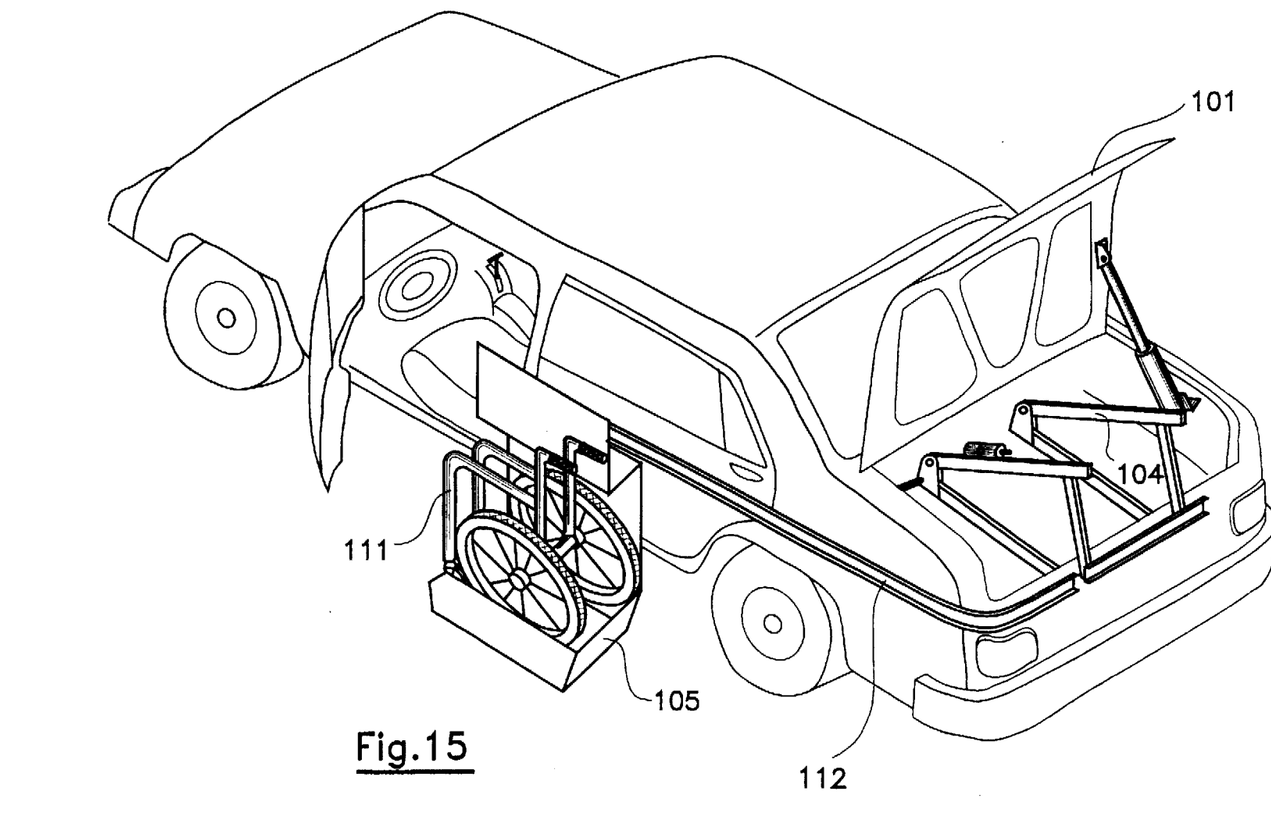
FIG. 15 shows the wheel chair already transported to forward position beside the car.

On command from the dashboard positioned means, actuated by the driver, the carrier 105 with wheel chair 111 is moved along rail 112 from position of FIG. 14 to that of FIG. 15, the carrier moving on the castors on the ground and being stabilized and guided by castors 108 on rail.

After arrival at the position of FIG. 15 the wheel chair can be manipulated in the known way by the driver of the car 100.

Figure 16:
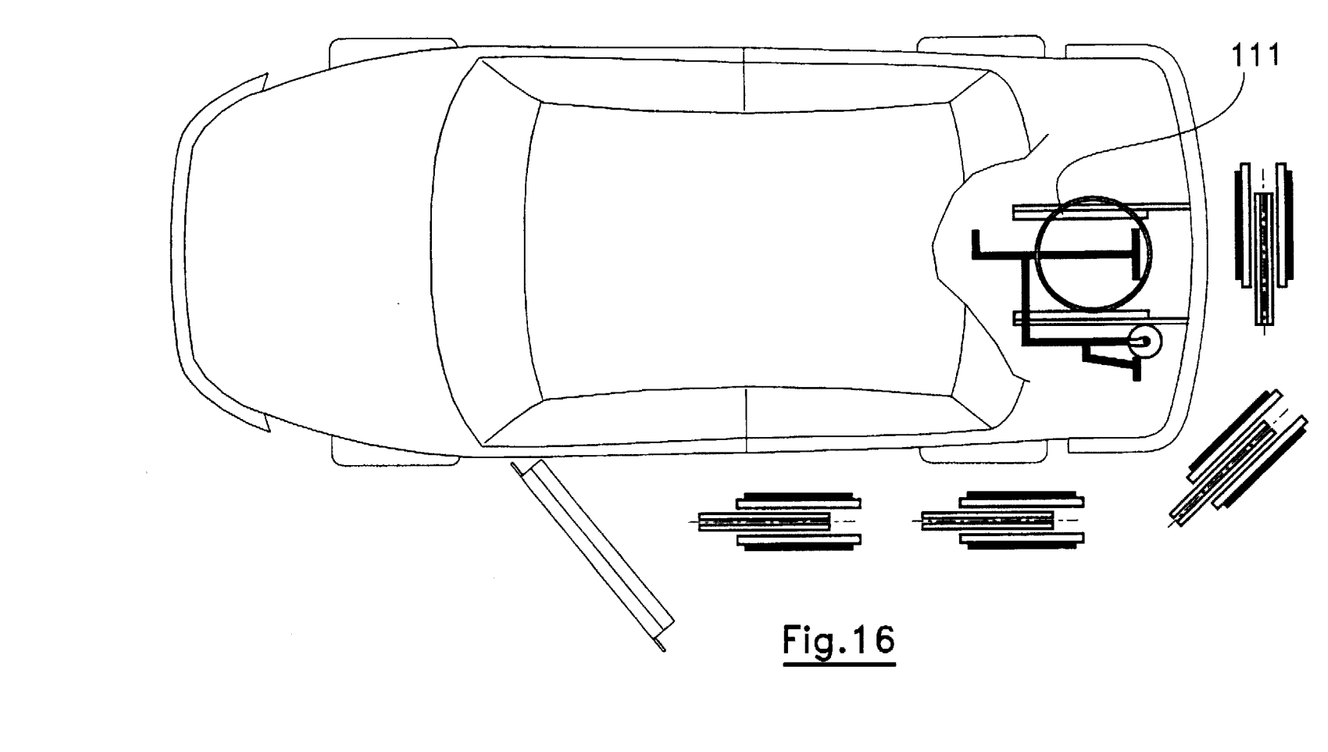
FIG. 16 illustrates the connective position of the wheel chair in the second embodiment of the invention.

The travel of the carrier with the wheel chair is symbolized by FIG. 16 which is self explanatory.

I claim:

1. In a motor car having a passenger compartment with a front door and a luggage compartment, an apparatus installed in said luggage compartment comprises mechanical and electrical equipment which includes carrier means for holding a wheelchair, said equipment further including a system of telescopic levers, having a pair of hingedly connected levers, for automatically controlling the movement of the wheelchair along a predetermined path, such that the wheelchair is moved by said carrier means from the luggage compartment to a position adjacent the front door of the passenger compartment of the motor car.

2. In the motor car as claimed in claim 1, further comprising an apparatus which includes:

- a first electromotor with a linearly acting gear being fixedly attached to the interior of the luggage compartment of said motor car adapted for opening said luggage compartment;
- said system of telescopic levers comprises said pair of hingedly connected levers, a first of said hingedly connected levers being affixed to the bottom of the luggage compartment, a second of said hingedly connected levers comprising at least two telescoping parts and carrying, at a free end, said carrier means for carrying or gripping the wheel chair when folded or laid on the bottom of the compartment;
- additional electromotors being provided for actuating said levers;
- an electric circuit; and,
- microswitches being part of said electric circuit for connection to an electric system of the motor car and adapted for automatically controlling said apparatus.

3. In a motor car having a passenger compartment with a front door and luggage compartment, an apparatus installed in said luggage compartment comprising mechanical and electrical equipment which includes carrier means for holding a wheelchair, said equipment further including a system of telescopic levers, having a pair of hingedly connected spatially expanding levers, being installed in the luggage compartment and connected to said carrier means for automatically controlling the movement of the wheelchair along a predetermined path, such that the wheelchair is moved by said carrier means from said luggage compartment to a position adjacent the front door of the passenger compartment of the motor car.

4. The motor car as claimed in claim 3 further including a rail extending on the exterior rear and side walls thereof on which castors affixed to the said carrier means can be rolled.

* * * * *